(12) United States Patent
Chang et al.

(10) Patent No.: US 7,303,704 B2
(45) Date of Patent: Dec. 4, 2007

(54) METHOD OF MANUFACTURING LIGHTWEIGHT CERAMICS

(75) Inventors: Cheng-Tsung Chang, 2F., No. 4, Alley 5, Lane 207, Sec. 3, Shinglung Rd., Wenshan Chiu, Taipei (TW); Ming-Kun Liu, Taipei (TW)

(73) Assignees: Ming-Tsung Liu, Taipei (TW); Cheng-Tsung Chang, Taipei (TW)

( * ) Notice: Subject to any disclaimer, the term of this patent is extended or adjusted under 35 U.S.C. 154(b) by 598 days.

(21) Appl. No.: 10/388,584

(22) Filed: Mar. 17, 2003

(65) Prior Publication Data

US 2004/0182111 A1 Sep. 23, 2004

(51) Int. Cl.
*C04B 400/00* (2006.01)
*C04B 35/00* (2006.01)

(52) U.S. Cl. .......................... 264/42; 264/51; 264/610

(58) Field of Classification Search ............ 264/41–42, 264/44, 51, 610, 656; 501/39, 80–83, 85
See application file for complete search history.

(56) References Cited

U.S. PATENT DOCUMENTS

| | | | | |
|---|---|---|---|---|
| 2,583,292 A * | 1/1952 | Bowen et al. | ............... | 264/128 |
| 2,682,092 A * | 6/1954 | Henricks | ............... | 164/14 |
| 2,706,844 A * | 4/1955 | Nicholson | ............... | 501/84 |
| 3,030,218 A * | 4/1962 | Robinson | ............... | 501/112 |
| 3,769,044 A * | 10/1973 | Horton | ............... | 106/38.3 |
| 3,793,134 A * | 2/1974 | Hardy et al. | ............... | 428/34.5 |
| 3,993,495 A * | 11/1976 | Galliath et al. | ............... | 501/80 |
| 4,004,933 A * | 1/1977 | Ravault | ............... | 501/81 |
| 4,028,122 A * | 6/1977 | Greenewald, Jr. | ............... | 501/84 |
| 4,071,369 A * | 1/1978 | Kurz et al. | ............... | 501/84 |
| 4,575,439 A * | 3/1986 | Hintzen et al. | ............... | 264/43 |
| 4,810,675 A * | 3/1989 | Dejaiffe | ............... | 501/31 |
| 5,002,904 A * | 3/1991 | Jain et al. | ............... | 501/80 |
| 5,087,278 A * | 2/1992 | Suzuki | ............... | 55/523 |
| 5,827,457 A * | 10/1998 | Tseng | ............... | 264/43 |
| 6,251,814 B1 * | 6/2001 | Kawai | ............... | 501/80 |
| 6,284,688 B1 * | 9/2001 | Trinkl et al. | ............... | 501/84 |
| 6,939,505 B2 * | 9/2005 | Musso et al. | ............... | 264/635 |
| 2005/0146066 A1 * | 7/2005 | Koide et al. | ............... | 264/44 |

* cited by examiner

*Primary Examiner*—Carlos Lopez
(74) *Attorney, Agent, or Firm*—Troxell Law Office, PLLC

(57) ABSTRACT

The present invention discloses a method of manufacturing lightweight ceramics by mixing several raw materials such as a powdered glass material, a powdered alkali silicate, and a water-soluble polymer in a certain proportion to form a dry substrate, and then adding water to mold the substrate into a desired shape; after the water in the substrate is baked dry, heat the substrate until the ceramic is formed. The oxide and hydroxide in the alkali silicate are used to lower the softening point of the powdered glass material, and when the powdered glass material is in the semi fluid state, the air and crystal water brought by the alkali silicate will expand and form air bubbles due to the high temperature. In the meantime, the water-soluble polymer at the high temperature will also be converted into a gas which will escape and form close pores inside the finished goods, and pores with open passages on the surface of the finished goods, such that the finished goods will have the lightweight, insulating, refractory, and water-resisting features.

7 Claims, 5 Drawing Sheets

Mechanical Shaping:

```
┌─────────────────────────────┐
│ Mix the raw materials in a  │
│ proportion to produce a     │
│ dry substrate.              │
└─────────────────────────────┘
              ↓
┌─────────────────────────────┐
│ Add 6% or less water.       │
└─────────────────────────────┘
              ↓
┌─────────────────────────────┐
│ Put in the mold.            │
└─────────────────────────────┘
              ↓
┌─────────────────────────────┐
│ Use the force of            │
│ 300kg/cm² for formation.    │
└─────────────────────────────┘
              ↓
┌─────────────────────────────┐
│ Bake to dry part of the     │
│ water (at about 110°C)      │
└─────────────────────────────┘
              ↓
┌─────────────────────────────┐
│ Burning (heat to 800°C,     │
│ and then stop heating)      │
└─────────────────────────────┘
              ↓
┌─────────────────────────────┐
│ Foaming                     │
└─────────────────────────────┘
              ↓
┌─────────────────────────────┐
│ Finished goods              │
└─────────────────────────────┘
```

FIG.3

Manual Shaping:
Mix the raw materials in a proportion to produce a dry substrate.
Add 10% or less water.
Put in the mold.
Use the force of 7kg/cm² for formation.
Blow dry.
Bake to dry part of the water (at about 110°C)
Burning (heat to 800°C, and then stop heating)
Foaming
Finished goods
FIG.4

Mechanical Shaping:

Mix the raw materials in a proportion to produce a dry substrate.

↓

Add 6% or less water.

↓

Put in the mold.

↓

Use the force of 300kg/cm² for formation.

↓

Bake to dry part of the water (at about 110°C)

↓

Heat to 800°C, and keep the temperature. Wait of 10 minutes.

↓

Foaming

↓

Finished goods

FIG.5

Manual Shaping:
Mix the raw materials in a proportion to produce a dry substrate.
Add 10% or less water.
Put in the mold.
Use the force of 7kg/cm$^2$ for formation.
Blow dry.
Bake to dry part of the water (at about 110°C)
Heat to 800°C, and keep the temperature. Wait of 10 minutes.
Foaming
Finished goods
FIG.6

METHOD OF MANUFACTURING LIGHTWEIGHT CERAMICS

BACKGROUND OF THE INVENTION

1. Field of the Invention

The present invention relates to a method of manufacturing lightweight ceramics, more particularly to a method of manufacturing a lightweight, insulating, refractory, and water-resisting ceramic products, so that such ceramic product can be widely used as a ceramic brick for the construction material, or even used as a lightweight aggregate after crumbling the finished goods in the manufacture.

2. Description of the Related Art

In addition to the feature of strong structure, a ceramic brick being a construction material also needs to have the lightweight, insulating, refractory, and water resisting features according to the site and applying conditions. Although the traditional ceramic sintering technology can produce the insulating, refractory, and water-resisting ceramic brick, it cannot break through the technology to lower the overall mass of the ceramic brick. The ceramic brick so produced has a heavy weight and will narrow the range of its applications.

Since the ceramic sintering technology cannot break through the technology in order to reduce the mass of the ceramic products, therefore the traditional way needs to find a substitution for the material technology originally suitable for applying ceramics, and thus affecting the development of the ceramic manufacturing industry.

SUMMARY OF THE INVENTION

The primary objective of the present invention is to provide a method of manufacturing lightweight ceramics by mixing several matters such as a powdered glass material, a powdered alkali silicate, and a water-soluble polymer in a certain proportion to form a dry substrate, and then adding water to mold the substrate into a desired shape; after the water in the substrate is baked dry, heat the substrate until the ceramic is formed. In the heating process, the porous powder of a alkali silicate will bring in the air, and the oxide or hydroxide in the alkali silicate is used to lower the softening point of the powdered glass material, and when the powdered glass material is in the semi fluid state, the air and crystal water brought by the alkali silicate will expand and form air bubbles due to the high temperature. In the meantime, the water-soluble polymer at the high temperature will also be converted into a gas which will escape and form close pores inside the finished goods, and pores with open passages on the surface of the finished goods, such that the finished goods will have the lightweight, insulating, refractory, and water-resisting features.

Another objective of this invention is to provide a method of manufacturing lightweight ceramics by mixing several matters such as a powdered glass material, a powdered alkali silicate, and a water-soluble polymer in a certain proportion to form a dry substrate, and then adding water to mold the substrate into a desired shape; after the water in the substrate is baked dry, heat the substrate until the ceramic is formed. In the heating process, a alkali silicate is used to lower the softening point of the powdered glass material, and when the powdered glass material is in the semi fluid state, the air bubble converted and formed by the water-soluble polymer escapes and form close pores inside the finished goods, and pores with open passages on the surface of the finished goods, such that the finished goods can also have the lightweight, insulating, refractory, and water-resisting features.

BRIEF DESCRIPTION OF THE DRAWINGS

Other features and advantages of the present invention will become apparent in the following detailed description of the preferred embodiments with reference to the accompanying drawings, in which:

FIG. 3 is a flow chart of the manufacture by mechanical shaping according to the present invention.

FIG. 4 is a flow chart of the manufacture by manual shaping according to the present invention.

FIG. 5 is a flow chart of the manufacture by mechanical shaping according to another embodiment of the present invention.

FIG. 6 is another flow chart of the manufacture by manual shaping according to the present invention.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
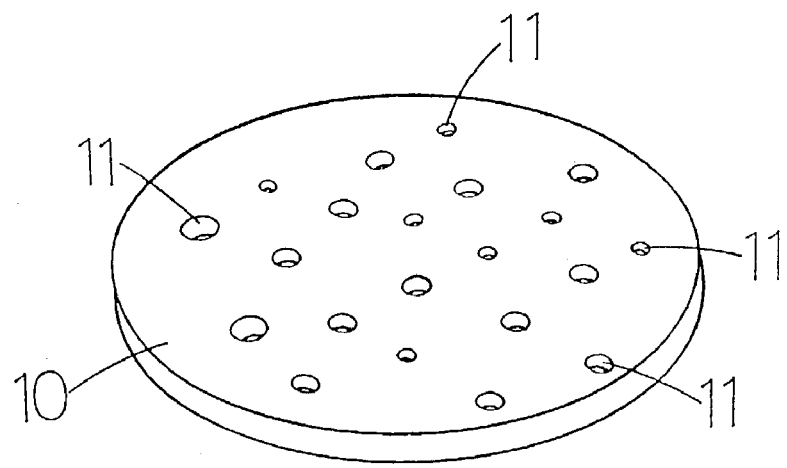
FIG. 1 is a perspective diagram of the ceramic product according to the present invention.
Figure 2:
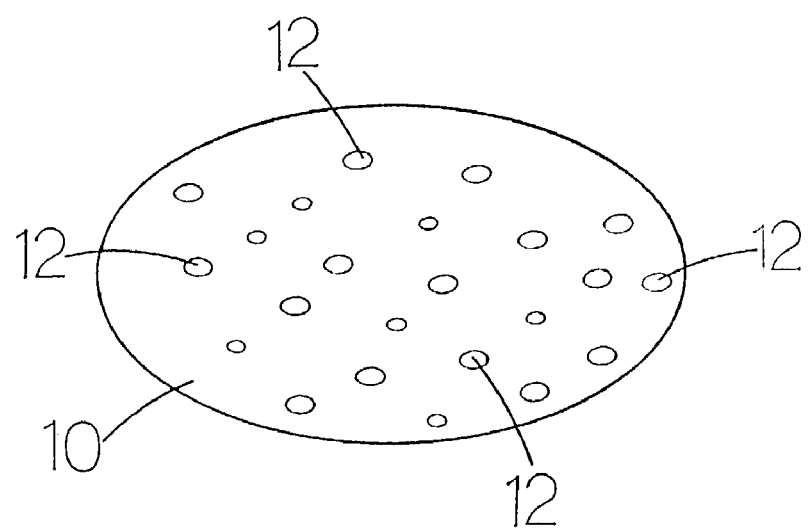
FIG. 2 is a cross-sectional diagram of the ceramic product according to the present invention.

A method of manufacturing lightweight ceramics according to the present invention is used to manufacture the ceramic products 10 as shown in FIGS. 1 and 2, wherein the ceramic product 10 has a plurality of open pores densely distributed on its surface, and a plurality of close pores 12 densely distributed inside the ceramic product 10. The entire ceramic product 10 is formed by the close pores 12 and has the lightweight, insulating, refractory, and water resisting features.

FIGS. 3 and 4 show the whole manufacturing flow of a method of manufacturing lightweight ceramics, and the proportion of each raw material is given below:

a. If the powdered glass material is of the low-temperature type, then:
1. Powdered glass material (with granule size below of 50 mesh): 90% by weight;
2. Powdered alkali silicate (could be sodium silicate): 3% by weight;
3. Additional water-soluble polymer (could be dextrin): 30% by weight.

b. If the powdered glass material is of the high-temperature type, then:
1. Powdered glass material (with granule size below of 50 mesh): 60% by weight;
2. Powdered alkali silicate (could be sodium silicate): 40% by weight;
3. Additional water-soluble polymer (could be dextrin): 3% by weight.

The differences between the high-temperature type and low-temperature type are as follows: It is the high-temperature type, if the powdered glass material is burned to 1000° C. without deformation; it is the low-temperature type if it is burned to 1000° C. with deformation; wherein the difference in size of the powdered glass material depends on the time of keeping the temperature in high temperature condition. The smaller the granule, the short is the time of keeping the temperature. Further, the quantity of water-soluble polymer (could be dextrin) in the mixture primarily only plays the role of determining the viscosity at constant temperature between the granules of powdered glass materials as well as providing some of the pores.

The following steps are included according to the difference of mechanical shaping or manual shaping:

A. Mix the powdered glass material, powdered alkali silicate, and water-soluble polymer according to a fixed proportion to produce a dry substrate, and the powdered glass material in the embodiment of this invention could be of the granule size of 50 mesh; the alkali silicate is sodium silicate containing sodium oxide, sodium hydroxide, or silicon oxide; and the water-soluble polymer is the dextrin with high carbon content. They are mixed in the proportion of 90% low-temperature type powdered glass material, 10% sodium silicate, and 3% (additional) dextrin, or 60% high-temperature powdered glass material, 40% sodium silicate, and 3% (additional) dextrin.

B. Add water to mold the substrate into a desired shape. The proportions of water in the mixture are below 6% and 10% according to the mechanical shaping or manual shaper respectively, and the raw material is molded and formed by the use of the mold, and the force produced are 300 kg/cm$^2$ and 7 kg/cm$^2$ according to the mechanical shaping and manual shaping respectively.

C. Remove part of the water, and bake at 110° C. until it is dry for the mechanical shaping. For manual shaping, blow dry the mixture first and then also bake at 110° C. until it is dry.

D. After heating the raw material to 800° C., stop heating (such heating temperature is adjusted according to the proportion of the alkali silicate by weight.)

In the heating process, the porous powder of the alkali silicate is used to bring in the air and the oxide and hydroxide in the alkali silicate are used to lower the softening point of the powdered glass material, and when the powdered glass material is in the semi fluid state, the air and crystal water brought by the alkali silicate will expand and form air bubbles due to the high temperature. In the meantime, the water-soluble polymer at the high temperature will also be converted into a gas which will escape and form close pores inside the finished goods, and pores with open passages on the surface of the finished goods, such that the finished goods will have the lightweight, insulating, refractory, and water-resisting features. Therefore, the ceramic product can be widely applied as ceramic bricks for the construction material, or even used as a lightweight aggregate after crumbling the finished goods in the manufacture.

FIGS. 5 and 6 show the raw materials and manufacturing flow of the method of manufacturing lightweight ceramic according to another embodiment the present invention, wherein the proportion of each raw material is given below:

1. Powdered glass material (with granule size below of 50 mesh): 95% by weight;
2. Alkali hydroxide (could be sodium hydroxide or potassium hydroxide): 5% by weight;
3. Additional water-soluble polymer (could be dextrin): 10% by weight.

The following steps are included according to the difference of mechanical shaping or manual shaping:

A. Mix the raw materials such as powdered glass material, and water-soluble polymer according to a fixed proportion to produce a dry substrate, and the glass material in the embodiment of this invention could be of the granule size of 200 mesh; the alkali hydroxide is sodium hydroxide or potassium hydroxide; and the water-soluble polymer is the dextrin with high carbon content. They are mixed in the proportion of 95% low-temperature type powdered glass material, 5% sodium hydroxide or potassium hydroxide, and 10% (additional) dextrin.

B. Add water to mold the substrate into a desired shape. The proportions of water in the mixture are below 6% and 10% according to the mechanical shaping or manual shaper respectively, and the raw material is molded and formed by the use of a mold, and the force produced are 300 kg/cm$^2$ and 7 kg/cm$^2$ according to the mechanical shaping and manual shaping respectively.

C. After heating the raw material to 800° C., keep the temperature constant and wit for 10 minutes.

In the heating process, the alkali hydroxide is used to lower the softening point of the powdered glass material, and when the powdered glass material is in the semi fluid state, the water-soluble polymer will be converted into a gas which will escape and form close pores inside the finished goods, and pores with open passages on the surface of the finished goods, such that the finished goods will have the lightweight, insulating, refractory, and water-resisting features by means of the formation of the close pores.

Of course, the ceramic products manufactured according to this invention can also directly add dyes into the process of mixing raw material and then heat the mixture, or add the color after the shaping and then sinter the mixture again, so that the ceramic product could be more colorful.

The method of manufacturing lightweight ceramics of this invention uses the oxide or hydroxide in the alkali silicate to lower the softening point of the powdered glass material, and when the powdered glass material is in the semi fluid state, the air and crystal water brought by the alkali silicate will expand and form air bubbles due to the high temperature. In the meantime, the water-soluble polymer at the high temperature will also be converted into a gas which will escape and form close pores inside the finished goods, and pores with open passages on the surface of the finished goods, such that the finished goods will have the lightweight, insulating, refractory, and water-resisting features by means of the formation of the close pores. Alternatively, a powdered glass material, an alkali hydroxide, and a water-soluble polymer are mixed with a certain proportion to form a dry substrate, After adding water to mold the substrate into a desired shape and heating the substrate, the alkali hydroxide is used to lower the softening point of the powdered glass material, and when the powdered glass material is in the semi fluid state, the water-soluble polymer is converted into a gas which will escape and form close pores inside the finished goods, and pores with open passages on the surface of the finished goods, so that the finished goods will also have the lightweight, insulating, refractory, and water-resisting features. The present invention provides a better feasible way of manufacturing lightweight ceramics.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A method of manufacturing lightweight ceramics, comprising the steps of:
   A. mixing a powdered glass material, a powdered alkali silicate, and a water-soluble polymer according to a fixed proportion to produce a dry substrate;
   B. adding water to the dry substrate and molding the substrate into a desired shape to produce a molded substrate;
   C. removing part of the water; and
   D. heating the molded substrate to a predetermined temperature to form a ceramic;
   wherein, in the heating step D, oxide and hydroxide in the alkali silicate being used to lower the softening point to the powdered glass material, and when the powdered glass material being in a semi fluid state, air and crystal water brought by the alkali silicate being expanded and forming air bubbles, the water-soluble polymer being converted into a gas and forming close pores inside the ceramic, pores with open passages on the surface of the ceramic.

2. The method of manufacturing lightweight ceramics of claim 1, wherein said powdered glass material is a granule of size below 50 mesh, said powdered alkali silicate is sodium silicate containing sodium oxide, sodium hydroxide, or silicon oxide, and said water-soluble polymer is dextrin, and said powdered glass material, powdered alkali silicate, and water-soluble polymer are mixed respectively in a proportion of 90%, 10% and 3% by weight.

3. The method of manufacturing lightweight ceramics of claim 1, wherein said powdered glass material is a granule of size below 50 mesh, said powdered alkali silicate is sodium silicate containing sodium oxide, sodium hydroxide, or silicon oxide, and said water-soluble polymer is dextrin with a high carbon content, and said powered glass material, powdered alkali silicate, and water-soluble polymer are mixed respectively in a proportion of 60%, 40% and 4% by weight.

4. The method of manufacturing lightweight ceramics of claim 1, wherein said predetermined temperature is 800° C.

5. A method of manufacturing lightweight ceramics, comprising the steps of:
   A. mixing a powdered glass material, a powdered alkali hydroxide, and a water-soluble polymer according to a fixed proportion to produce a dry substrate;
   B. adding water to the dry substrate and molding the substrate into a desired shape to produce a molded substrate;
   C. removing part of the water; and
   D. heating the molded substrate to form a ceramic;
   thereby, in the heating step D), the alkali hydroxide being used to lower the softening point of the powdered glass material, and when the powdered glass material being in a semi fluid state, the water-soluble polymer at a predetermined temperature being converted into steam and carbon dioxide gas and said gases forming close pores inside the ceramic, and pores with passages on the surface of the ceramic.

6. The method of manufacturing lightweight ceramics of claim 5, wherein said powdered glass material is a granule of size below 50 mesh, said powdered alkali silicate is sodium silicate containing sodium oxide or sodium hydroxide, and said water-soluble polymer is dextrin, and said powdered glass material, powdered alkali silicate, and water-soluble polymer are mixed respectively in a proportion of 95%, 5% and 10% by weight.

7. The method of manufacturing lightweight ceramics of claim 1, wherein said predetermined temperature is 800-1100° C.

* * * * *